Patented May 4, 1954

2,677,658

UNITED STATES PATENT OFFICE 2,677,658

MANUFACTURE OF WATERPROOF PRODUCTS

Auguste Florentin Bidaud, Serezin-du-Rhone, France, assignor to Societe des Usines Chimiques Rhone-Poulenc, Paris, France, a French body corporate No Drawing. Application October 30, 1950, Serial No. 193,033

Claims priority, application France July 15, 1947

5 Claims. (Cl. 252—28)

This invention relates to waterproof products and particularly to waterproof silicic greases and pastes and is a continuation-in-part of application Serial No. 774,417, filed September 16, 1947, and later abandoned.

In United States application Serial No. 712,045, filed November 25, 1946, now abandoned, and United States application Serial No. 750,880, filed May 27, 1947, now abandoned, waterproof compositions are described, which consist of a solid water-repelling substance in the form of very fine powder incorporated in a non-volatile water-insoluble liquid.

Particularly useful products are those obtained by employing, as the water-repellent solid, silicon dioxide previously waterproofed by treating it with an organo-silicic compound and by employing, as the non-volatile liquid insoluble in water, a liquid organo-silicic polymer. In addition to their waterproof properties, these products, which have the consistency of greases or pastes, are only slightly sensitive to the action of heat, are good dielectrics and are valuable when applied to the most varied materials, in particular electric conductors, to protect them against the action of water or moisture.

Products having the consistency of greases, pastes or oils and possessing the same valuable properties can also be obtained from a liquid organo-silicic polymer and silicon dioxide which has not been subjected to any waterproofing treatments. However, silicon dioxide which has not been waterproofed cannot be directly incorporated in such high proportions as when it has been previously waterproofed; in the case of nonwaterproofed silicon dioxide, minor proportions, such as for example from 0.1 to 15% can be incorporated in order to increase more or less the viscosity of the liquid: viscous oils, greases or pastes are obtained, which, in the latter case, can be rendered more homogenous when worked again after a standing time at high temperature such as for example 100° C. or more. With higher proportions of silicon dioxide, such as for example 25% or more, friable mixtures or powders are obtained, which are of no practical value. Even after a standing time at the hereinbefore mentioned temperatures and subsequent working, only heterogenous products of poor appearance can be obtained.

According to the present invention a waterproof product is obtained by mixing a liquid organo-silicic polymer, such as an organo polysiloxanic oil, with very finely powdered silicon dioxide, the latter forming at least 25% by weight of the mixture, allowing the mixture to stand for a period of at least one week at room temperature and thereafter working the mixture, which is still friable or powdery, until it is converted into a waterproof grease or paste.

The products obtained have the consistency of greases or pastes and have waterproof properties. Their precise properties depend on various factors including the nature of the liquid organo-silicic polymer employed, the proportion of silicon dioxide added, the time during which the mixture is allowed to stand, and the duration and intensity of the working, e. g. crushing or grinding, operation.

The results obtained are specific to the procedure defined above. Thus for example, the same results are not obtained if the step of allowing the mixture to stand is omitted, or if an oil is employed other than a liquid organo-silicic polymer. Thus it is already known to thicken oils which are not organo-silicic polymers by incorporating therein silicon dioxide obtained by combustion, but at the most 10% or 15% of silicon dioxide can be introduced, which gives thick oils, or at the best very soft greases which have a relatively low drip point and are very sensitive to the action of heat. If there is incorporated in oils which are not organo-silicic polymers quantities of silicon dioxide of the order of those referred to in the present application (25% or more), there are obtained, as with liquid organo-silicic polymers, friable or powdery products but these, contrary to what happens with the products obtained from liquid organo-silicic polymers, remain in the friable or powdery state even if they are stored for several weeks and then crushed or ground.

Liquid organo-silicic polymers which are adapted to the present invention may be obtained by the hydrolysis and the chemical condensation of one or more hydrolysable silicon compounds having the general formula $RR'SiX_2$ wherein R and R' are lower alkyl or aryl radicals which may be the same or different and X is a hydrolysable group selected from the class consisting of halogen and alkoxy groups. They may also be obtained by the hydrolysis and chemical condensation of a mixture of alkylated or arylated silicon compounds containing at least 75 mole per cent of such silicon compound having the general formula $RR'SiX_2$ and not more than 25 mole per cent of a mono-alkyl or aryl silicon compound having the formula $RSiX_3$, or a total of not more than 25 mole per cent of both such mono-alkyl or aryl silicon compound having the formula RSiX₃ and an alkyl and/or aryl silicon compound having the formula RR'R''SiX R'' being an alkyl or aryl group.

In carrying out this invention there may be employed, as silicon dioxide, various very fine silica powders now on the market, for example those obtained by the combustion of silicic compounds, such as silicon tetrachloride, ethyl silicate and the like.

This silicon dioxide is mixed with the liquid organo-silicic polymer in such proportion as to be at least 25% by weight of the mass obtained. Proportions of from two to three parts of oil to one of silicon dioxide generally give satisfactory products. Preferably the proportion of oil should not be lower than one part of oil to one of silicon dioxide, and generally proportions of silicon dioxide between 25 to 40% of the mass are preferred.

In order that the working may convert the friable or powdery mixtures, obtained by mixing the liquid organo-silicic polymer and the silicon dioxide, into products according to the invention, a certain minimum period of storing of at least one week at room temperature is essential.

Liquid organo-polysiloxanes rendered more viscous with lower proportions of finely divided silicon dioxide such as for example 15% or less may be converted into waterproof products having the consistency of oils, greases or pastes, when subjected to the action of heat during a shorter time and then worked to be converted into homogeneous products, and the products obtained by this way have approximately the same appearance as the products obtained after a longer standing time of the mixture at a lower or ordinary temperature before the final working.

In contrast, however, the friable or powdery masses which are prepared according to the present invention in mixing a liquid organo-silicic polymer with silicon dioxide, the latter forming at least 25% of the mixture, may be converted, after storing for at least a week at room temperature and then working, into products which are by far superior to those products which can be obtained with the same proportions of the same ingredients but after a shorter storing time at more elevated temperature.

After storing at room temperature, the mixtures, which are still powdery or friable, are subjected to a more or less prolonged and energetic treatment such as crushing, for example with a spatula, which converts these powdery or friable masses into homogeneous pastes or greases. The consistency of these pastes or greases can be reduced by more prolonged working or forcing between closely disposed surfaces at least one of which is moved relatively to the other such as for example in a "Premier Mill" or the like.

Products of a wide range of properties may thus be obtained. Generally speaking, each mixture has a minimum unctuosity or viscosity limit which can be obtained by allowing a sufficient period of standing and effecting a sufficiently prolonged or sufficiently energetic crushing or grinding operation. The character of the products is stable for all practical purposes.

The following examples, in which the parts given are by weight, serve to illustrate the invention but are not to be regarded as limiting it in any way.

Example I 35 parts of silicon dioxide in the form of very fine powder previously compressed in order to reduce its volume, are placed in a malaxator of the Werner Pfleiderer type and 65 parts by weight of dimethyl polysiloxane having a viscosity of 100 cst. at 20° C. are added thereto. After several hours of malaxation, the powder obtained is stored for 15 days in a closed receptacle at room temperature. The mass is then worked with a spatula on a slab, whereby it is converted into a homogeneous waterproof grease, the consistency of which can be reduced by more prolonged working or forcing between movable crushing members of a grinder of the "Premier Mill" type. This waterproof grease, which has a consistency of about 100 as measured by the ASTM penetrometer, has a drip point higher than 180° C. and remarkable anti-binding properties.

It is to be noted that if the working in the malaxator is continued, for example, for two days, the product remains in powder form. Moreover, if the powder is subjected to the crushing hereinbefore described after only one day's storage, it cannot be converted into grease. This example therefore illustrates the importance of the combined effect of the period of storage and of the crushing.

Example II

By employing in Example I a liquid polymer of dimethyl silicone having a viscosity of 140 cst. at 20° C. freed in vacuo at 300° C. from the volatile products which may be present therein, a grease is obtained which is similar but which is suitable for the lubrication or coating of parts intended to operate in vacuo.

Example III 28 parts of silicon dioxide obtained by the combustion of ethyl silicate are intimately mixed with 72 parts of liquid organodisubstituted polysiloxane in which the organic radicals are methyl and phenyl. After being left in the air for ten days, the product obtained can be converted into grease by mechanical crushing.

I claim:

1. Process for the production of waterproof products which comprises mixing a liquid polymer of an organo silicone wherein each organo group is a methyl radical with silicon dioxide, the latter being in the form of an empalpable powder and forming at least 25% by weight of the mixture, storing the mixture for a period of at least one week at room temperature and thereafter working the mixture until it is converted at least to the consistency of a smooth paste.

2. Process for the production of waterproof products which comprises mixing a dimethyl polysiloxane with silicon dioxide, the latter being in the form of an empalpable powder and forming at least 25% by weight of the mixture, storing the mixture for a period of at least one week at room temperature and thereafter working the mixture until it is converted at least to the consistency of a smooth paste.

3. Process for the production of waterproof greases which comprises mixing a liquid polymer of an organo silicon wherein each organo group is a methyl radical with silicon dioxide, the latter being in the form of an empalpable powder and forming at least 25% by weight of the mixture, storing the mixture for a period of at least one week and thereafter subjecting the mixture to mechanical grinding between closely disposed surfaces at least one of which is moved relative to the other until it is reduced to the consistency of grease.

4. Process for the production of waterproof products which comprises mixing a liquid polymer of an organo silicone wherein each organo group is a methyl radical with silicon dioxide, the latter being in the form of an empalpable powder and forming 25 to 40% by weight of the mixture, storing the mixture for a period of at least one week at room temperature and thereafter working the mixture until it is converted at least to the consistency of a smooth paste.

5. Process for the production of waterproof greases which comprises mixing a liquid polymer of an organo silicone wherein each organo group is a methyl radical with silicon dioxide, the latter being in the form of an empalpable powder and forming 25 to 40% by weight of the mixture, storing the mixture for a period of at least one week and thereafter subjecting the mixture to mechanical grinding between closely disposed surfaces at least one of which is moved relative to the other until it is reduced to the consistency of grease.

References Cited in the file of this patent

UNITED STATES PATENTS

| Number | Name | Date |
|---|---|---|
| 2,428,608 | Bass | Oct. 7, 1947 |
| 2,460,795 | Warrick | Feb. 1, 1949 |